United States Patent [19]

Mattaboni

[11] Patent Number: 4,638,445
[45] Date of Patent: Jan. 20, 1987

[54] AUTONOMOUS MOBILE ROBOT

[76] Inventor: Paul J. Mattaboni, 9 Wildwood Dr., Medfield, Mass. 02052

[21] Appl. No.: 618,438

[22] Filed: Jun. 8, 1984

[51] Int. Cl.$^4$ ............................................. G06F 15/50
[52] U.S. Cl. ................... 364/513; 180/168; 364/424; 901/1; 901/46; 901/47
[58] Field of Search ........ 364/513, 478, 479, 191–193, 364/167–171, 424; 901/1, 9, 10, 46, 47, 42, 49, 50; 318/580, 587; 180/167, 168, 169

[56] References Cited

U.S. PATENT DOCUMENTS

| | | | |
|---|---|---|---|
| 4,028,533 | 6/1977 | Matsubara | 901/1 X |
| 4,119,900 | 10/1978 | Kremnitz | 901/1 X |
| 4,500,970 | 2/1985 | Daemmer | 901/1 X |

OTHER PUBLICATIONS

Prendergast et al–"A General–Purpose Robot Control Language"–Byte Magazine, vol. 9, No. 1, pp. 122–128, 130–131, Jan. 1984.
Biber et al–"The Polaroid Ultasonic Ranging System'–67th Convention of Audio Engineering Society–New York, 1980–pp. 1–11.
"Meet the RB5X" Brochure–RB Robot Corporation, Golden, Colo.–May 1984.
Cohen et al–"Principles of Artificial Intelligence", Various Extracts–William Kaufman Publ. Co.
Hollis–"Newt: A Mobile, Cognitive Robot"–pp. 30–45, received, PTO Scientific Library, Oct. 1983.
Marce et al–"An Autonomous Computer–Controlled Vehicle"–Proc. of 1st International Conf. on Automated Guided Vehicle Systems, pp. 113–122, 1981.
Marce et al–"A Semi–Autonomous Remote Controlled Mobile Robot"–Industrial Robot–Dec. 1980.

Primary Examiner—Joseph Ruggiero
Attorney, Agent, or Firm—Louis Orenbuch

[57] ABSTRACT

A vision system for a mobile robot employs at least two arrays of sensors for obtaining data on the position and distance of objects in a workspace. One of the sensor arrays is used principally to see near objects and the other array is used principally to see far objects. The two arrays are symmetric about an axis that extends through the body of the robot. The robot carries a computer which controls the sequence in which the sensors are serially polled for information. Data received from the sensors is stored and provides a representation of the space and objects seen by the sensors. A software program causes the computer to manipulate data from the sensors to simulate rotation of the robot around the axis of symmetry and control behavior of the robot to complete goals set by input commands from a natural language processor.

6 Claims, 7 Drawing Figures

AUTONOMOUS MOBILE ROBOT

FIELD OF THE INVENTION

The present invention relates in general to automatic orientation and control of a mobile robot. More particularly, the invention pertains to a system which utilizes an ultrasonic transducer array in a vision system to produce data that is used in a software process which enables the mobile robot to be self-controlled. This invention permits a general purpose personal computer to serve as host to the software process which processes the data and derives signals that control the mobile robot.

DESCRIPTION OF PRIOR ART

Present expertise in the technology of mobile robot design has followed two distinct design approaches.

The first design approach leads toward "dumb" robots which are constrained to move within hardware-defined boundaries.

The second design approach leads toward "smart" robots capable of making decisions and carrying out actions with little (or no) operator intervention.

Following the first design approach, German Patent Publication No. 2,020,220 discloses an arrangement for the automatic working of a limited surface. In this arrangement, a surface-working apparatus, such as a vacuum cleaner, travels on the surface and changes its direction of travel at the borders of the surface. To this end, the apparatus travels on the surface in accordance with a trajectory sequence, for which obstacle limits and dimensions are ascertained by contact with the obstacles; as this occurs, respective signals are stored in a memory, whereby the surfaces (even those behind an obstacle) become accessible for the working operation.

The device taught by that German publication is typical of devices of this type; the workspace and obstacles are sensed in an essentially blind manner and, by design, the devices have no onboard decision-making ability.

One drawback of this approach is that precise performance is unobtainable from the device when the working surface has many obstacles or where the obstacles are arrayed in complex patterns because of the inability to process large amounts of data and because inadequate data storage is provided.

Another disadvantage of this approach arise from the limitations inherent in a device dedicated to one purpose and one work surface which thereby rule out provisions giving the device the flexibility to handle unforeseen events, or situations. The method is innately limited to applications where frequent operator attention and intervention is available, and device operation in the absence of an operator is not an objective.

A third disadvantage of this approach relates to the fact that the hardware movement constraints lead to individual, one-of-a-kind systems which are costly and inefficient. In addition, these constraints result in a loss of functional degrees-of-freedom, thereby greatly limiting the device's ability to react in real time. Moreover, some devices of this type, those employing tracks or rigidly installed wires on the work surface, allow only one degree-of-freedom in movement—resulting in even more severe functional limitations.

Following the second design approach, that leading toward "smart" robots, U.S. Pat. No. 4,119,900 discloses a mobile robot utilizing a plurality of different distance-measuring methods and being guided by a system of multiple computers, each dedicated to a special purpose. The distance-measuring methods are employed to gather data about the work space to form a vision system. This patent also teaches the use of multiple, single-purpose, dedicated computers to compute trajectory curves on an x, y plane representing the work surface; the trajectory computations are used to determine the most efficient path to follow in order to reach a goal.

This U.S. patent discloses specific wheel drive means and power source means. These means and many others are now well-known in the art. This patent also discloses the use of electro-optical means for distance measurement in the far range, as well as both electro-acoustical and contact means for distance measurement in the near range, with contact supplying the final determination of distance.

This U.S. patent also teaches the use of standard computer software processes for computation of trajectories, utilizing standard mathematical algorithms, from a known point to another known point in order to achieve the most efficient path between the points. Here the attributes of the workspace are predetermined and therefore a given device is limited to a specific workspace.

One disadvantage of this device is the lack of decision-making ability within this mobile robot's software processes, other than the ability to compute the most efficient path between two known points in the predefined workspace. Because, often, only one (and sometimes none), of the points on a path are known, the mobile robot disclosed by U.S. Pat. No. 4,119,900, suffers from limitations that make that robot useless for some applications.

Another disadvantage of this device arises from the use of software processes based on standard mathematical algorithms that require a large computational capability. Because the mathematical computations require so much time, the robot must use multiple computers to provide the overall computational power needed and still perform a given task in a reasonable time period. An overly complex and costly system results. Moreover, the use of dedicated computers, each designed for one specific application, also leads to the additional need for unique software processes for each application.

To remedy this disadvantage, a software process could be provided which is of a generic form not unique or limited to any particular application, and which does not require the intense mathematical computational abilities of the U.S. Pat. No. 4,119,900 design. With such software, a single general purpose computer (which could be utilized for other purposes when the mobile robot is not in operation) could be employed, thereby increasing the overall utilitiy of the apparatus.

A third disadvantage of this device arises from the use of multiple distance-measuring methods. Apart from the need for using multiple computers and unique software processes to perform the standard mathematical algorithms (as discussed above), multiple computers are also needed in this design because of the multiple distance-measuring methods involved. The varied nature of the data types imposes a need for a dedicated computer for each type and an associated expanded computational capability to convert and synthesize the various data into useful form in reasonable time.

A fourth disadvantage of this design is the limited range of each of the multiple methods of distance measurement in the horizontal and vertical planes. Each of these multiple methods is directed in the forward direction only, thereby limiting the mobile robot to gathering data about the workspace to the forward direction. Under this limitation the mobile robot must be constantly reoriented in order to gather data about the entire workspace. Also, because each of these methods is highly directional, only objects and obstacles at the same, or approximately the same, vertical elevation can be detected, further limiting the data gathered about the workspace. Furthermore, none of the individual distance-measurement methods is optimized in any way which would be compatible with providing an artificial vision system—an absolute prerequisite for a mobile robot. These multiple methods simply lead to excess complexity and cost, precluding this design from being considered a practical device.

A fifth disadvantage of this device is the use of physical contact with obstacles in the workspace as one of the measurement methods. Such contact can lead to damage to either the obstacles or the mobile robot and, therefore, it is prudent to avoid the use of physical contact techniques.

A sixth disadvantage of this device is the use of only standard mathematical algorithms to provide control of mobile robot movements in the absence of an operator or when an unexpected variable is introduced into the workspace. Such control requires decision-making ability that is obtained only through the use of artificial intelligence algorithms and software processes.

Also following the second approach cited earlier (that leading toward "smart" robots) another example of the prior art is a presently available mobile robot called RB5X produced by the RB Robot Corporation. That robot employs a dedicated single-purpose computer based on an N.S. 8073 microprocessor with a computer program built into the chip. The program is a BASIC Language Interpreter which converts the high-level software language, BASIC, into machine-level instructions. This allows an operator to give commands in the form of BASIC language statements; statements may be chained together and then performed in sequence.

A component of this robot system is a desktop personal computer which is used as a host to a natural language interpreter for converting operator language into BASIC language statements. The conversion is accomplished by a method called "adaptive pattern recognition". An operator statement is initially matched with a BASIC language counterpart such as "BLOW YOUR HORN"=@#7801=#80. From this point on the operator may simply input to the computer "BLOW YOUR HORN" and the robot will be given the correct instruction for this action. If the operator wishes to change the phrase he may convert: X to "SOUND THE HORN" and from then on either, or both, phrases will automatically be converted to the proper BASIC language statement. Also, if the words of a command are misspelled or some letters are missing, the natural language interpreter will still recognize the phrase.

When operating, this mobile robot utilizes multiple means for collision avoidance. None of the multiple means, however, is optimized for use as a practical, all-directional object-detection method and none offers any means for realization of an artificial vision system.

One of those means utilizes a single, forward-facing ultrasonic transducer which generates a single, narrow-beam to detect objects in its range. The single transducer, however, has a very limited range in the horizontal and vertical planes and, while it may detect an object directly in front of it (within a distance of up to 35 feet), it cannot detect objects to either side of the beam, or objects below or above the work surface height of the transducer. The robot may rotate to aim the beam in a new direction in the workspace; however, such action requires much too much time to scan the entire workspace on a continuous basis than is practical for a mobile robot.

The second object-detection means is an infrared sensor which detects the presence of reflective objects on the work surface. The infrared sensor is utilized in a manner similar to that used in the first approach where a track (or reflective tape) is laid down on the work surface, and the mobile robot follows the track.

The third and last detection means is a series of contact pads on the surface of the robot body, positioned around its perimeter. The contact pads provide a means of collision detection. This arrangement relies upon touch and consequently is a tactile rather than an artifical vision system.

The chief difficulty with this design is in the use of multiple detection arrangements, with none of them optimized to permit object recognition, or collision avoidance, except in a very limited way. The detection arrangements in no way constitute an artificial composite vision system, nor even a collision avoidance system, both of which are absolute prerequisites for a practical autonomous mobile robot. Specifically, the ultrasonic transducer system is far too beam-limited to function as a true vision system. Moreover, since the mobile robot must collide wih an object before it detects it, the use of contact pads hardly constitute a collision avoidance method. Also, the contact-pad detectors are positioned at certain locations on the robot body so that collision with an object at some other location on the robot body is not detected, and that collision may persist until operator intervention occurs.

Another difficulty with this design is the use of a non-mobile desk top computer for communication with and command of the mobile robot. The mobile robot, when disoriented, is unable to request assistance, to answer questions, or to be commanded in the workspace, except when connected to its base station.

A further difficulty with this design is the inability of the natural language processor to interpret the meaning or contents of an operator command sentence. While the design allows a cross-reference library to be built up wherein certain finite phrases are related to certain pre-programmed BASIC language statements, an operator command not in the cross-reference library and not relatable to a known command by the adaptive pattern recognition capability, goes unrecognized. The preferred relationship would be to have a natural language processor that can break down a command sentence into its most basic elements, relate these elements to their meanings, and then determine the meaning and content of the command (subject, predicate, etc.). This would provide the mobile robot with the ability to deal with any command phrase, so long as the words, or vocabulary, have been predefined, eliminating the need for pre-definition of the relationships between words.

A final difficulty with this design is that the software process does not have any provision for making decisions about what action to take. This design does not have the ability to process, in any meaningful way, the data collected by its sensors. It does not provide any means to correlate sensor data with an operating goal in such a way as to support decisions on any, even the simplest, action to take. This design can only perform the direct sequential commands fed to it by the operator from the base station before moving out into the workspace.

This design is described at length in the article "A General-Purpose Robot Control Language", BYTE Magazine, Vol. 9, No. 1, pg. 123. It is fundamentally equivalent to the designs of other mobile robots in the prior art such as the Heath Kit HERO-1 et al.

There is a need for a mobile robot system which utilizes an optimized, single distance-measuring method of ultrasonic means, like that taught by U.S. Pat. No. 3,454,922, but improved and perfected further for the purpose of collecting data about the workspace into which the mobile robot is placed and outputting this data in the most useful and efficient form through the specific geometric arrangement of an ultrasonic sensor array constituting a mobile robot vision system.

There is also a need for a mobile robot equipped with a simple hardware interface between the mobile robot vision system, the wheel motor drive, and a general purpose personal computer, which allows a reduction in cost and complexity of the mobile robot to be attained by using readily available components.

There is a need for a mobile robot system employing a general purpose personal computer utilizing a software process which enables the mobile robot to carry out effective decision-making processes in consonance with rules allowing autonomous self-control while requiring only limited operator assistance. This software process, preferably, is arranged to conserve the general purpose personal computer's resources.

There is also a need for a user-software interface consisting of a natural language (such as English) processor so that persons untrained in computer programming can operate and communicate with the mobile robot with proficiency.

This "needed" mobile robot may utilize any of the many wheel motor drive systems or power supply methods now known in the art for propulsion.

OBJECTS OF THE INVENTION

It is an object of the invention to provide a mobile robot with a vision system employing single distance-measuring ultrasonic means for the collection of data about the workspace into which a mobile robot is placed. In accordance with the invention, the ultrasonic vision system utilizes a plurality of transducers arranged in a geometric array that assures the quality and utility of the vision system is optimal at all distances and is optimal for all obstacle arrangements encountered within the workspace, thereby eliminating the need for contact sensors to ascertain the location of obstacles in the workspace.

Another object of the invention is to provide a hardware interface between the vision system, the wheel motor drive, and a general purpose personal computer, which interface provides a connection to the universal parallel interface port of a personal computer to thereby give the mobile robot the versatility to use virtually any general purpose personal computer.

A further object of the invention is to provide a software process which imposes rules to reach objectives without operator intervention, and applies the rules to the data acquired by the vision system (e.g., to determine the shape, size and configuration of the workspace on a continuous basis). In accordance with the invention, commands given by the operator are interpreted to determine the objective of a command. The rules may be simple (or complex) conditional statements, using tokens taught previously by an operator, or may be general rules (previously taught) initially provided with the robot, which allow the mobile robot to operate in the absence of an operator in order to accomplish its goals. This software process provides the decision-making ability necessary to make the mobile robot truly autonomous.

Another object of this invention is to provide a mobile robot system with a user-software interface which utilizes a natural language processor to enable an operator to command a mobile robot with simple natural language statements whereby the operator is able to direct the work and actions of the mobile robot without the necessity for previous training in computer programming.

Other objects and attendant advantages of the invention will be more readily appreciated as the same becomes better understood by reference to the following detailed description when considered in connection with the accompanying drawings in which like-referenced symbols designate like parts throughout the figures.

DESCRIPTION OF THE PREFERRED EMBODIMENT

Figure 1:
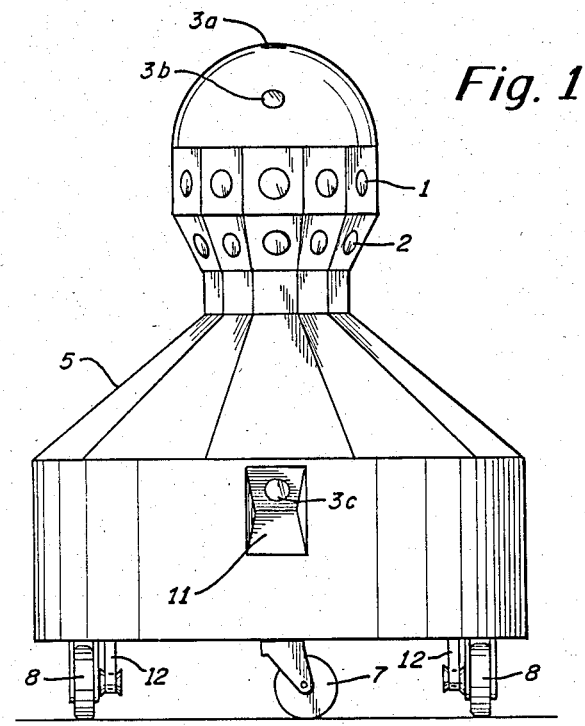
FIG. 1 is a front elevational view of a mobile robot embodiment of the invention and shows the placement of the ultrasonic transducers in the robot's vision system.
Figure 2:
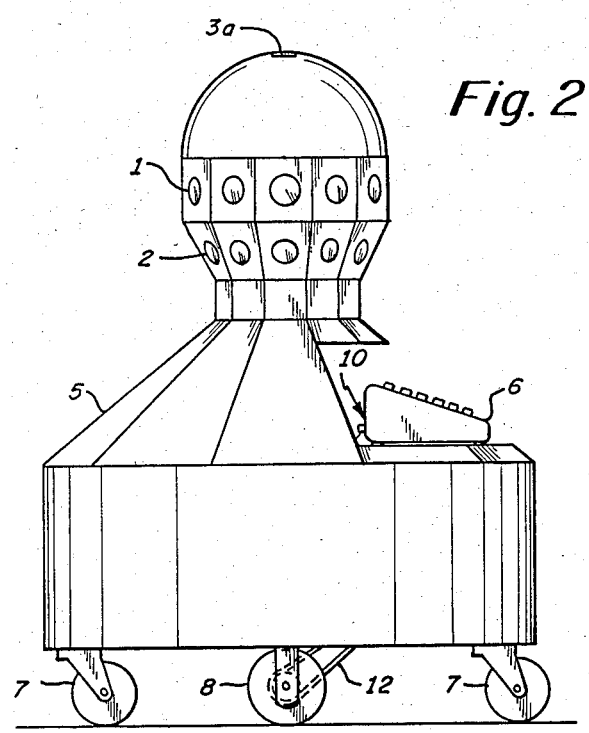
FIG. 2 is a side elevational view of the mobile robot embodiment and illustrates the placement of a general purpose personal computer and the ultrasonic transducers of the vision system.

Referring now to FIGS. 1 and 2, the mobile robot 5 carries a plurality of ultrasonic transducers 1, 2, 3a, 3b, and 3c of a type developed by the Polaroid Corporation specifically for use as high speed, variable range, noise immune distance-measuring devices. That type of transducer is described in detail in the paper titled "The Polaroid Ultrasonic Ranging System" number 1696 (A-8) presented at the 67th Convention of the Audio Engineering Society.

The transducers 1 and 2 are disposed in two symmetrical concentric arrays around the entire perimeter of the robot. By cyclically polling each transducer in turn, the entire 360° extent of the surrounding workspace can be ultrasonically scanned.

As described in the Polaroid paper, the sensor electronic drive circuit allows the gain of the sensor, and therefore the threshold amplitude of an echo to be received, to be varied dynamically. The gain is defined as being equivalent to the sensitivity to an echo of the sensor and its circuitry.

In the operation of the robot's vision system, the gain variation is from low gain to high gain and the shift in gain is a cyclic event which is begun upon completion of the transmission of an ultrasonic pulse, and is terminated and reset at the transmission of the next pulse. As time passes the gain of the sensor is increased to allow reception of pulses having lower and lower amplitudes. The purpose of this is to prevent low amplitude noise from being received as echos from near range objects; since near range objects should reflect back a strong echo, low gain may be used. Ultrasonic pulses decrease in amplitude due to attenuation over distance so that an echo from a distant object requires a higher gain in order to be received. Therefore, the shift of gain with time allows the sensor to be immune to noise in the near range while permitting the reception of valid echos from distant objects. This ensures that no confusion will arise, due to noise, when the sensors are operating in the near range for collision avoidance.

While the shifting of a sensor's variable gain is handled automatically in the hardware, the software may choose to limit the time in which signals from a sensor are accepted. In this way the sensor may be effectively manipulated to operate in the near range or far range simply by controlling the time duration in which data from a sensor is gathered from short to long, respectively, This is called "time domain shifting", where the "time domain" is the period between the transmission of a pulse and reception of an echo back from an object at some distance. The magnitude of the time period for a given distance is easily ascertained since the speed of sound in air is known. Therefore, the maximum distance from which echos will be accepted may be selected by the software process, which in effect chooses the vision system range. At present, this dynamic adjustability allows the robot's vision system to perform adequately at distances and ranges up to approximately 35 ft.

The polling mode of operation allows the minimum number of sensors immovably fixed on the robot to accomplish the task of "seeing" the workspace, lowers the complexity and cost of the system, and allows the vision system to collect and output a minimum of raw data without limiting the actual information carried by the data, thereby saving memory space and reducing the demand on the computer's resources to the extent that the use of an inexpensive, low powered personal computer is permitted.

Referring again to FIGS. 1 and 2, the ultrasonic transducers 1 are disposed in a symmetrical array in which each transducer in the array covers a certain sector of the workspace. That arrangement allows the data produced to be structured in the most usable and compact manner possible. Each transducer, during a scanning cycle of the workspace, is polled in turn and the distance to each object in the sensor's range which provides an echo of sufficient amplitude is measured and converted to a digital number, from 0 to 65535, which is then used by the software process. This polling involves initiating the transmission of an ultrasonic pulse and then waiting for the time (the time domain selected by the software) in which data produced by reception of echos is gathered. At the end of the time domain, the software stops monitoring the polled sensor and moves to the next sensor, in a cyclic manner, until each active sensor in the array has been polled, at which time the cycle may be repeated.

Figure 6:
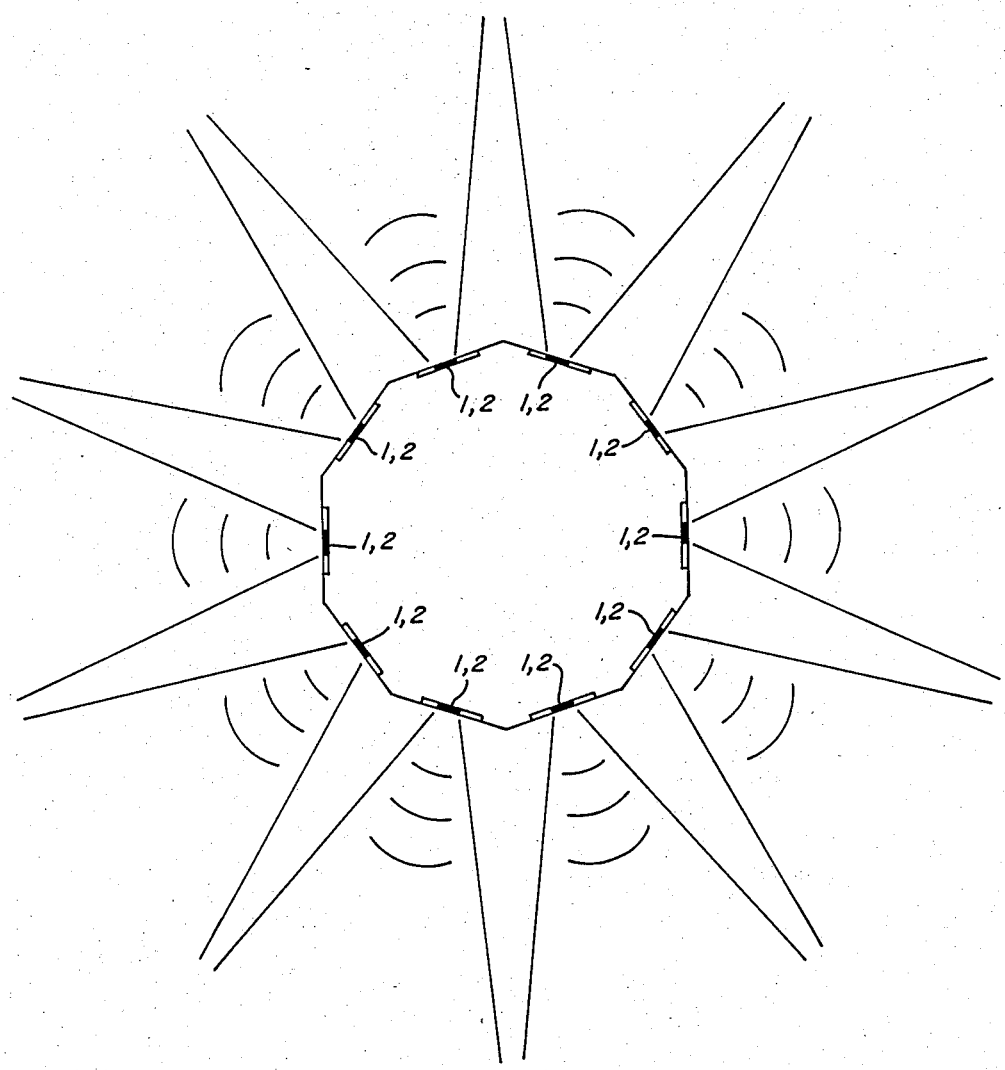
FIG. 6 is a top view of the mobile robot vision sensor output field which illustrates the range and direction of ultrasonic pulses outputted by the vision system sensors.
Figure 7:
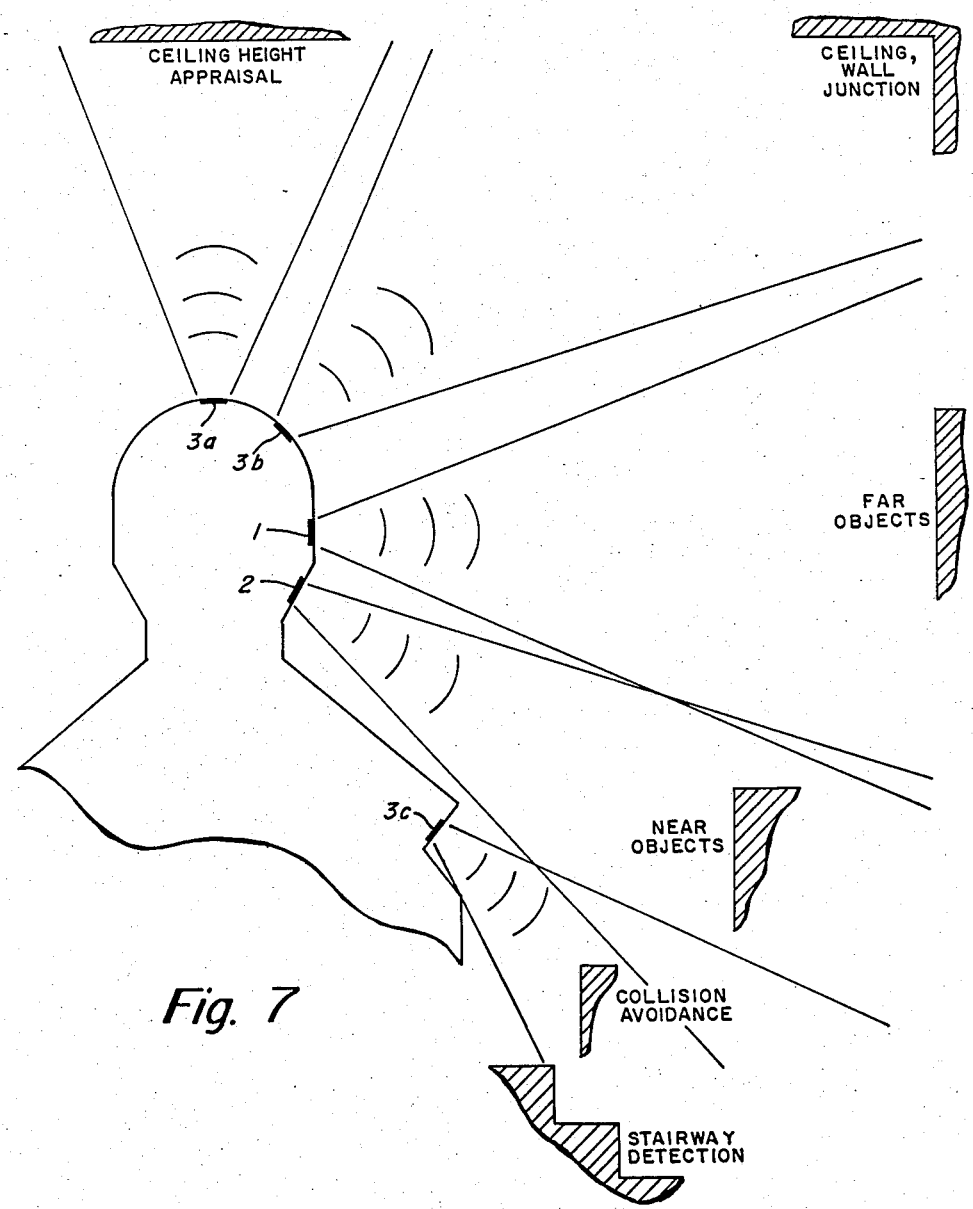
FIG. 7 is a side view of the mobile robot vision sensor output field which illustrates the range and direction of ultrasonic pulses outputted by the vision system sensors.

Referring now to FIGS. 6 and 7, the data from each sensor 1 represents a certain solid fraction of a cylinder, and due to this cylindrical symmetry the vision system may be rotated either by the mobile robot physically rotating or more preferably by simulating rotation of the mobile robot with software that manipulates the data. The ability to rotate in software the vision data that represents the workspace, is crucial to the efficient accurate pattern-matching processes used in the software process in realtime operations. Any geometry or symmetry could work as a vision system, but a non-symmetrical or complex array adds complexity of the system and leads to an impractical design; therefore, a cylindrically symmetric arrangement is preferred. In this way, the data more easily represents a "seen" workspace and the patterns "seen" by the vision system can be dealt with more effectively in the realtime environment of a mobile robot.

Referring again to FIGS. 1 and 2, the vision system employs a plurality of ultrasonic transducers 2 directed outward and downward. The transducers 2 are dedicated to the purpose of collision avoidance, as well as more intricate movement in close proximity to objects, and to the purpose of subsurface obstacle appraisal (e.g., stairways).

The ultrasonic transducers 2 are separate and distinct from the previously mentioned transducers 1 due to their downward angle, which limits their overall range. However, through the use of the aforementioned variable gain shifting and time domain shifting processes, the utility is enhanced since they are adjusted for use in the near range in proximity to obstacles.

When in close proximity to low obstacles the primary transducers 1 become less useful for collision avoidance because their beams may be above the low obstacles and thus an obstacle may be out of range altogether. The primary transducers, therefore, may not provide accurate and reliable enough data to ensure that a collision does not occur. By providing the secondary transducers 2 to detect close objects, the mobile robot has full, safe mobility at all ranges with respect to objects in the workspace.

Preferably at least three additional ultrasonic transducers are employed, as indicated in FIG. 1. One of those transducers, 3a, faces directly upward with respect to the work surface and is used to gather data on ceiling height. Another of those transducers, 3b, faces upward at an angle to gather data on ceiling to wall junctions. The remaining one of those transducers, 3c, is mounted at the base of the mobile robot, facing downward at an angle, and is used to gather data on surface texture (e.g., type of floor covering used in the workspace). This information obtained by those two sensors can be of great importance to the software process since, for instance, the ceiling height often drops as the mobile robot passes through a doorway, or the floor covering changes from one work area to another. This is valuable data when pattern matching is used for decision making and determination of orientation.

Both the shifting of the variable gain control of the circuits of transducers 1, 2, 3a, 3b, 3c and the conversion of analog distance information to binary digital information are handled in the hardware on an automatic basis, which off-loads many realtime responsibilities from the software process and personal computer resources.

In the invention, the polling of each active transducer 1, 2, 3a, 3b, 3c, as well as time domain switching, are completely controlled by the software process—allowing total control of vision system range and configuration on a dynamic basis.

Circuits suitable for use in the vision system transducer control are well-known in the prior art and therefore will not be described; however, they are described in the previously cited Polaroid paper.

Still referring to FIG. 1, the wheel drive system of the robot may be a conventional drive system of the kind that is well-known in the prior art and is, therefore, not here described. In FIGS. 1 and 2, wheels 8 are driven by drive belts 12 and the non-driven wheels are indicated by reference numeral 7.

Referring to FIG. 2, the mobile robot carries a general purpose personal computer 6, such as the Commodore 64 or other personal computer, as host to the software process. This allows the mobile robot to be controlled by virtually any available personal computer so that the operator may supply his/her own computer, or be free to choose a personal computer which may fulfill other roles when the mobile robot system is not in operation. The mobile robot and personal computer communicate through an industry standard IEEE 488 parallel interface port, allowing complete compatibility with virtually any computer.

Preferably the personal computer employed in this mobile system is light in weight and low in power consumption. All actions of the mobile robot, from ultrasonic transducer 1, 2, 3a, 3b, 3c polling to wheel drive controls, are controlled by transmitting a 16-bit number (a bit being a 1 or 0 piece of data) between the personal computer and the mobile robot through the standard parallel interface.

Figure 3:
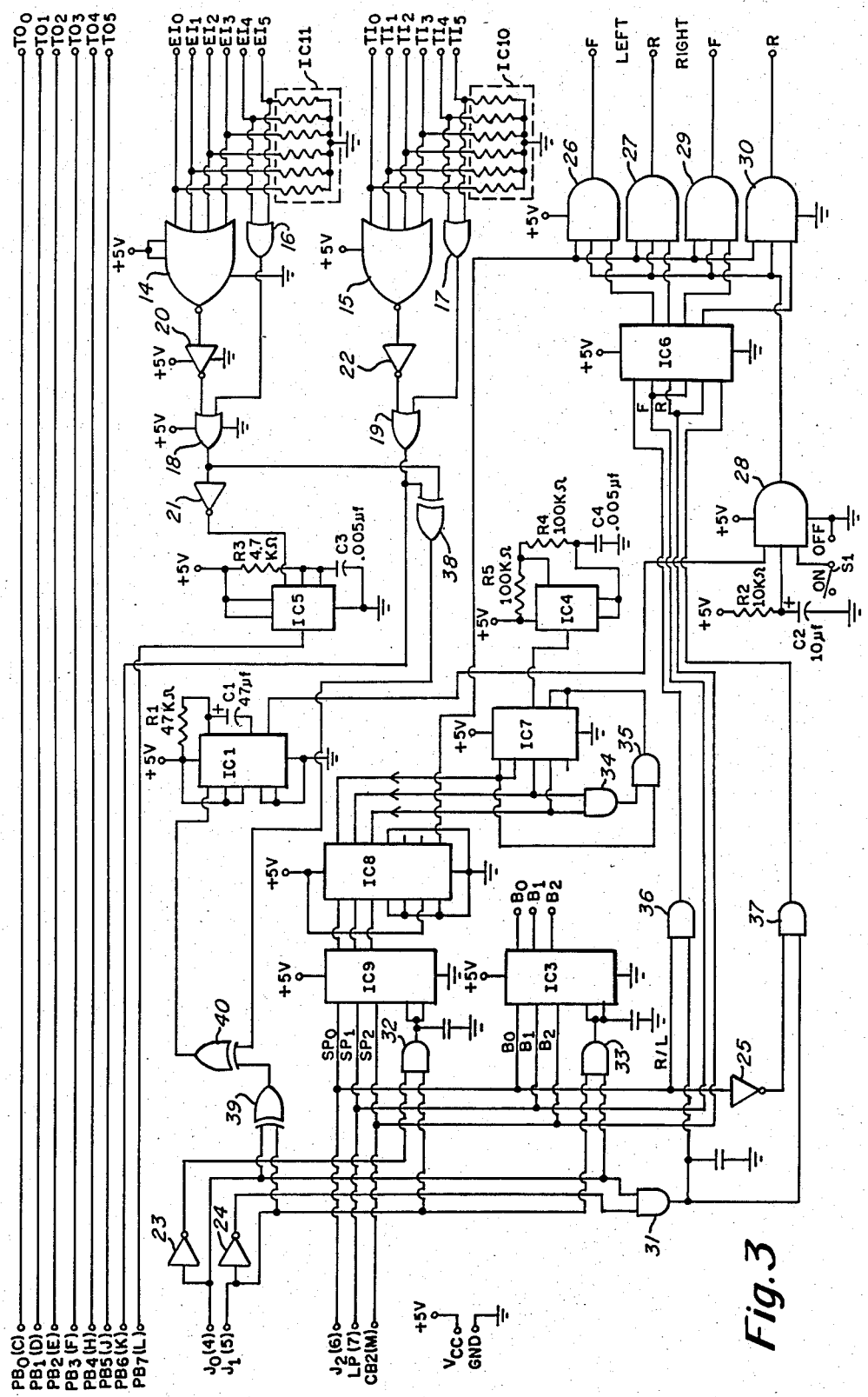
FIG. 3 is a schematic diagram of the hardware interface which links the general purpose personal computer with the mobile robot system in accordance with the principles of the present invention.

Referring now to FIG. 3, a hardware interface within the mobile robot is utilized to convert the digital numbers, sent by the personal computer through the IEEE 488 parallel interface, into individual control signals to be carried out by the mobile robot. The digital numbers outputted by the hardware interface to the personal computer are derived from the vision system data obtained from each active, individual sensor in turn during polling.

FIG. 3 is a schematic diagram of this hardware interface. The hardware interface consists of five components, each with a specific function. This interface conforms to the IEEE 488 parallel interface standard with up to 8 input, 8 output, and 8 control lines implementable. The components of the hardware interface are: (1) the sensor transmission demultiplexer; (2) the sensor echo data retrieval multiplexer; (3) the wheel motor speed control circuit; (4) the wheel motor direction control circuit; and (5) the "deadman" protection circuit.

The hardware interface, preferably, provides the maximum off-loading of realtime control duties from the general-purpose personal computer. The movement controls employed in the hardware interface work on a decision latching principle where the behavior decision outputted by the software process is latched, and the hardware actions determined by this output remain in effect until a new decision is arrived at and outputted to the interface. Thus, the need for the software process to continually output to the interface, or for the interface to contain any timers for managing time durations of different actions, is removed. The software process may output a decision for the mobile robot to move, and then, while the movement is occurring, the software process can monitor the "seen" environment as it changes.

When the "seen" environment changes to the point where a new decision should be made, the software process simply outputs the new behavior to the interface and the actions of this new behavior are begun, so on and so forth.

The vision sensor controls are nonlatching and the software process individually controls each vision sensor during a polling operation because the vision sensors are pulsed and do not operate as "continuous" output devices.

The vision-sensor drive circuits, preferably, are of the kind produced by the Polaroid Corp. and are utilized in this embodiment to provide the variable gain control for the vision sensors, as previously described. The software process outputs a 16-bit (9 bits are used) digital number which denotes the vision sensor (1 of 24), which is to be pulsed. The hardware interface demultiplexes this digital number into 6-bits, to pick one of six vision drive circuits; the other 3 bits are decoded to determine which of 4banks (4 banks, 6 sensors in each) the sensor is in. The selected vision drive circuit then causes an ultrasonic pulse to be outputted by the chosen sensor. This ultrasonic pulse, when reflected by objects in the workspace, produces echos.

After outputting a pulse, the software process waits for transmission confirmation from the drive circuit and then presets a software or hardware timer inside the general purpose computer which counts down from some number, the number being that corresponding to the selected sensor time domain. When a pulse is received by the drive circuit, the vision sensor array of the currently selected bank (the outputs of all six sensor drive circuits are wire OR'd together) produces a signal which forms the input from the hardware interface to the general purpose personal computer. The software process waits for this input and, upon receipt, the timer, originally preset, is read. A mathematical process is performed to determine the length of time between pulse transmission and echo reception and this time determines the distance to an object. If no echo is received (i.e., the timer count reaches zero before an echo occurs), the software process will assign the maximum value (maximum time domain) to the echoes that were expected. The software process may also reset the echo reception indicator and wait to receive additional echoes from other objects reflected from the same pulse. The software process, beyond the zeroing of the timer, may disregard an echo as well and simply poll the next sensor in a cycle so that the software process may limit the time domain within which an echo is considered valid in two ways.

In the FIG. 3 circuit diagram, timer 1C1 is a 74L122 type integrated circuit. IC3, IC6, and IC9 are latches of the 74LS75 integrated circuit type. Quad input OR gates 14 and 15 are each part of a 74LS25 type integrated circuit. Dual input OR gates 16, 17, 18, and 19 are each part of a 74LS32 integrated circuit. Signal inverters 20, 21, 22, 23, 24, and 25 are each part of a 74LS04 hex type integrated circuit Tri-input AND gates 26, 27, and 28 are each part of a 74LS11 type integrated circuit. Tri-input AND gates 29 and 30 are part of another 74LS11 type integrated circuit. Dual input AND gates 31, 32, and 33 are parts of another 74LS08 type integrated circuit device. EXCLUSIVE OR gates 38, 39, and 40 are parts of a 74LS86 type integrated circuit. IC7 is a 74LS93 type integrated circuit which, in conjunction with IC4, forms a binary up-counter. IC4 and timer IC5 are each part of a 7556 integrated circuit.

In the description that follows, it is assumed that integrated circuit devices of the above designated type are used. It is, of course, apparent to those knowledgable of electronics that discrete circuitry or other types of electronic devices can be used to replace the designated types.

The first component of the hardware interface, the vision sensor transmission de-multiplexer, consists of 6 output lines $PB_0-PB_5$, AND gate 33, and IC3.

The identification number of one of the 42 possible vision sensors (only 24 currently implemented) is outputted by the general purpose personal computer. An individual 1 of 6 sensors in a particular bank is selected on line $PB_0-PB_5$, while the particular bank of sensors (to be mated with the six drive circuits outlined in this design) is selected by decoding the data on lines $B_0-B_2$. The control lines $J_0$ and $J_1$ are used to control IC3, which is a latch of the 74LS75 type. When a bank is selected, the data on lines $J_2$, LP, and $CB_2$ are latched into IC3 and the bank is available on pins 10, 15, 16, as $B_0-B_2$. This provides a simple method for polling individual transducers, since the software process simply outputs a 16-bit number on which is encoded the proper values which each of the 13 input/output lines (out of 24 input/output/command lines of the IEEE 488 protocol) to the hardware interface requires for the operation. When a sensor is selected, the drive circuit causes a pulse to be transmitted by that sensor.

The second component of the hardware interface is the vision sensor echo data retrieval multiplexer. This component employs OR gates 14, 15; inverters 20, 21, 22; OR gates 16, 17, 18, IC5; and resistors within IC10 and IC11 which are used as pull downs. This component of the hardware interface has, as its input, the output of the sensor drive circuits.

The input is of a dual type: relative to the first input, the drive circuits do not transmit instantaneously as commanded by this interface; therefore, the exact moment of transmission must be known. The drive circuits provide outputs to indicate transmission and these are the first type of inputs, $TI_0$ to $TI_5$ (transmit indicator), one for each sensor in a bank, placed on pins 1, 2, 4, 5 of OR gate 15 and pins 12, 13 of OR gate 17. These inputs are pulled down, while inactive, by IC10 resistors, each of which is 1.5K ohm resistor. Inputs of the second type are the actual echo outputs of the drive circuits. These inputs (echo inputs) are placed on pins 9, 10, 12, 13 of OR gate 14 and pins 9, 10 of OR gate 16, and are pulled down, while inactive by IC11 resistors, each of which has a value of 1.5K ohms.

These echo inputs are ORed by gates 14 and 16. The output of OR gate 14 is inverted by inverter 20 and the inverted signal is fed to OR gate 18 which also receives an input from gate 16. The output of OR gate 18 is inverted and applied to the input of timer chip, IC5. The IC5 timer stretches out the echo so that the software process has time to receive the echo for processing, and so that noise and other variations on the inputs are not perceived as multiple echoes. The output $PB_7$ of the IC5 timer is outputted directly to the computer to enable the software process to read the timer.

The transmit indicator inputs from the drive circuits are also ORed by gates 15 and 17. The output of gate 15 is inverted by inverter 22 and applied to OR gate 19 which also receives an input from gate 17. The signal from gate 19 is outputted (at terminal $PB_6$) directly to the computer to indicate to the software process that transmission has begun so that a timer can be preset and started fro count-down.

The third component of this interface is the wheel motor speed control circuit. This component employs inverter 23; AND gates 32, 34, 35; IC7; IC4; IC8; and AND gates 26, 27, 29, and 30. The motor speed control code is input by the computer on lines $J_0$ and $J_1$ which control latch IC9. The data on lines $J_2$, LP, and $CB_2$ (on 000 to 111 binary or 0-7 decimal) contain one of 7 possible speed selections, plus STOP. IC8 is a counter which is preset by the data latched on pins 10-, 15, 16 of IC9. IC4 and IC7 form a 3 bit binary up-counter, counting at a fixed rate, the output of which is fed to IC8 pins 9, 11, 14. IC8 compares the latched data with the counter (IC7) data; when the former is less that the latter, pin 5 of IC8 toggles; when the data from IC7 reaches zero, pin 5 of IC8 toggles again. The pin 5 output of IC8 provides the duty-cycle contro of the wheel drive motors through the tri-input AND gates 26, 27, 29, and 30. This circuit, by varying the duty cycle, controls the speed of the mobile robot motors.

The fourth component of the hardware interface is the wheel motor direction control. This component employs inverters 24, 25; AND gates 31, 36, 37; and IC6. Input controls lines $J_0$ and $J_1$ are used in combination with data on input lines $J_2$, LP, and $CB_2$ which are latched by IC6. The latched data is outputted on pins 16, 15, 9, 10 to gates 26, 27, 29, and 30 and determines whether each motor (left or right) shall rotate forward, backward or not rotate at all. This arrangement provides control of the mobile robot's direction and rotation.

The fifth component of the hardware interface is the "deadman" protection circuit which is used to monitor mobile robot activity, and to provide a time out, and turnoff of the wheel motors, if the software process has not made a new behavior decision, or polled vision sensors for some time. This component provides a means for deactivation of the mobile robot on an automatic basis if a computer or other hardware failure has occurred (thus preventing the mobile robot from causing damage to its environment). This circuit employs EXCLUSIVE OR gates 38, 39, 40, IC1, AND gate 28, switch 31, and RC circuit $R_2$, $C_2$.

Activity indication on the vision sensor circuits is provided by way of pins 9 and 10 of EXCLUSIVE OR gate 38 which are connected to the vision sensor echo and transmit indication lines. Activity indication on the motor control circuits is provided by way of pins 12 and 13 of EXCLUSIVE OR gate 39 which monitor control lines $J_0$ and $J_1$ for proper operation.

The output of EXCLUSIVE OR gate 40 is fed to IC1 (a timer), resetting IC1's count. If no input is received, IC1 will "time out" and signal pin 3 of AND GATE 28, turning off the outputs of gates 26, 27, 29, 30 and shutting down the wheel motors. This circuit is a reliable "deadman" circuit and provides protection against failure of the general purpose computer.

Swith S1 of the "deadman" circuit provides the operator with the means of shutting down the robot at will, while the RC (time delay) circuit $R_2$, $C_2$ provides a time delay during "power up" to prevent the robot from being started from powerup with the wheel motors turned up. This permits the software process to set the motors to the "off" position before the motors are enabled.

Figure 5:
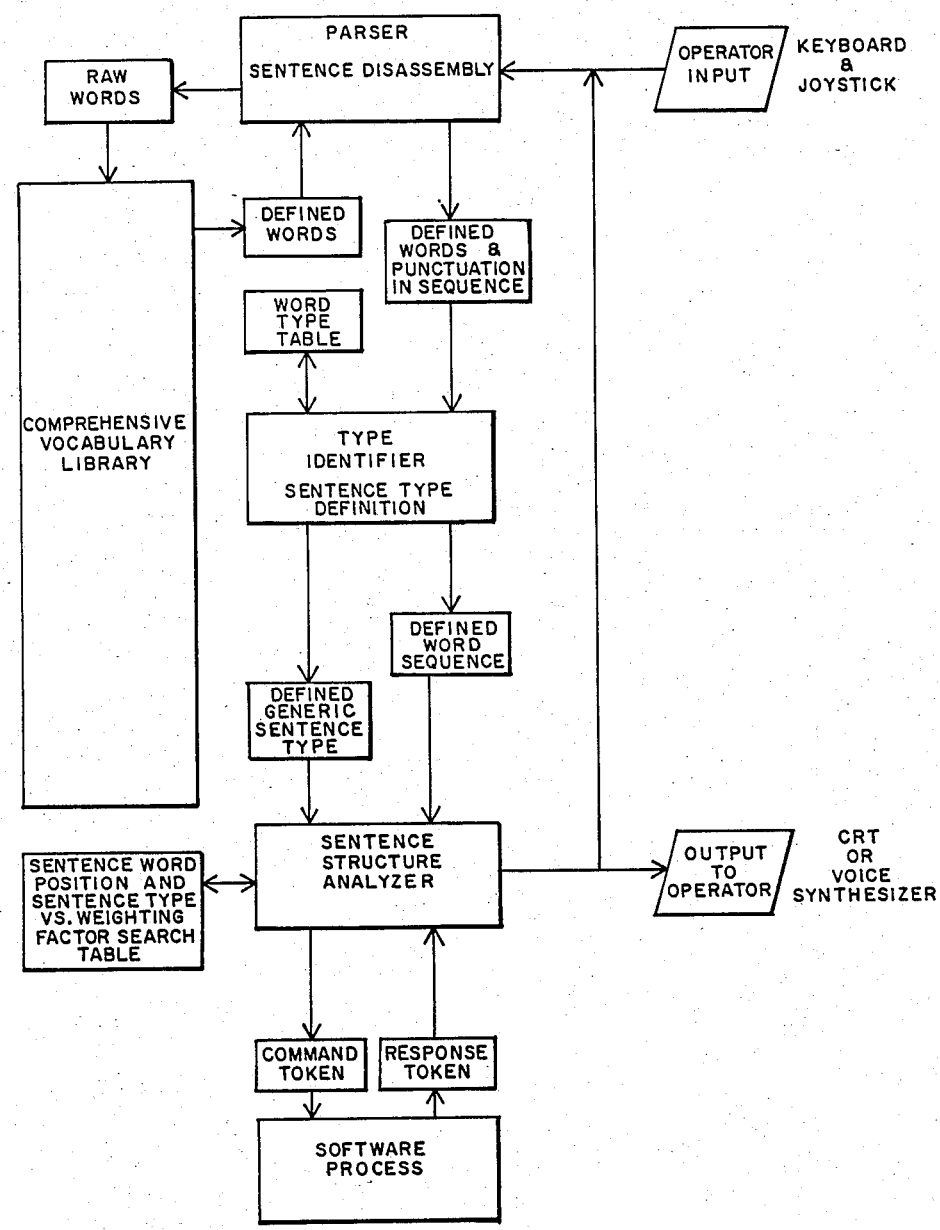
FIG. 5 is a flow chart of the natural language interpreter employed in the invention.

Referring now to FIG. 5, the operator is in communication with the mobile robot system and software process through the user interface. This interface consists of a natural language (e.g., English) processor, an input-output handling task which feeds keyboard data (or voice recognition data, depending on the personal computer used), to the natural language processor, or back from the natural language processor to an output device, and a joy stick handler whose input/output may be used during the manual mode for teaching. A voice synthesizer may also be used to allow hands-free interactive communication and control of the mobile robot system, even with nonoperators in the workspace. FIG. 5 illustrates the flow of data within the user interface and the basic structure of the natural language processor.

Throughout the description of the software process description, examples of code implementation are given for the key points of the software process to facilitate a better understanding. These examples include a code specific explanation, a pseudo computer language code implementation, and code implementation comments.

The natural language processor is used to disassemble an operator sentence (command, question, or declarative) into component parts and then convert this information into a form to be used by the software process for goal evaluation; or, to reconstruct data from the software process into a response to an operator question; or to provide a statement of the present goal for operator confirmation.

The natural language processor has four component parts, which are: the Parser, the Type Identifier (which has a search-tree-like structure), the Sentence Structure Analyzer (which also has a search-tree-like structure), and the Comprehensive Vocabulary Library.

The Parser receives an operator sentence and disassembles it into individual words and punctuation, as well as any special relationships between words. The words and punctuation are compared against a Vocabulary Library which contains the definition of each word type and punctuation mark. The word type is passed in the original sequence to the Sentence Structure Analyzer. The raw words and punctuation are also sent in sequence to the Type Identifier.

To convert an operator command into command tokens, the parser reads each word in a command sentence by whatever method is specific to the user's computer. The command words are then separated and compared to the vocabulary library using a standard tree search method (the library is in a hierarchal configuration i.e. alphabetic order) and each word is tagged with the type of word it is (i.e. noun, verb, etc.) and a number denoting its position in the library. The library entry for each word holds all pertinent information for the word including vision data patterns for objects or situations. The output of the parser contains the command sentence in sequence with each word tagged by its generic type and library entry number and this is fed to the Type Identifier element and the Sentence Structure Analyzer.

The vocabulary library has the following format:

| ENTRY # (LIBRARY LETTER) | CHARACTER STRING | WORD TYPE | WEIGHTING FACTOR |
| --- | --- | --- | --- |
| 10 | FORWARD | "ADVERB" 2 | 6 |
| 22 | MOVE | "VERB" 3 | 10 |
| 101 | . | "PERIOD" 9 | 9 |

EXAMPLE A

|  | |
| --- | --- |
|  | IMPORT COMMAND-WORD; ADDRESS OF COMMAND WORDS, |
|  | IMPORT NUMBER-OF-COMMAND-WORDS; SUPPLIED BY COMPUTER |
|  | IMPORT LIBRARY-END; OS. |
|  | IMPORT LIBRARY-LETTER; BASE ADDRESS OF VOCAB. |
|  | ; LIBRARY. |
| NEW WORD | GET WORD (COMMAND-WORD) +; INPUT A COMMAND WORD. |
|  | INCREMENT A; COUNT THE WORDS |
|  | MASK (COMMAND-WORD)(I) = LETTER; MASK OUT ALL BUT ONE |
|  | LETTER AND I IS IT. |
| LOOP | COMPARE LETTER TO LIBRARY-LETTER(I); COMPARE THE LETTER |
|  | IF MATCH GO TO RANGE; TO EQUIVALENT LETTER IN LIBRARY. |
|  | IF LIBRARY-LETTER = LIBRARY-END GO TO MATCH; NO MATCH |
|  | INCREMENT LIBRARY-LETTER (I); POSSIBLE, ELSE INCREMENT |
|  | GO TO LOOP; TO NEXT ENTRY AND LOOP. |
| RANGE | INCREMENT I; MATCH NEXT LETTER IN |
|  | IF I > 10, GO TO MATCH; TIME FOR NEW COMMAND WORD. |
|  | ELSE LOOP; SEARCH FOR NEXT LETTER. |
| MATCH | IF A < NUMBER-OF-COMMAND-WORDS; END OF COMMAND SENTENCE? |
|  | SAVE LIBRARY-LETTER (TYPE, WEIGHTING FACTOR) AT (COMMAND TOKEN) |
|  | GO TO NEWWORD; SAVE INFORMATION AT COMMAND TOKEN POINTER. |
|  | ELSE NUMBER-OF-COMMAND-WORDS = NUMBER COMMAND-TOKENS |
|  | OUTPUT COMMAND-TOKEN; PASS POINTER TO COMMAND |
|  | JUMP TO TYPE IDENTIFIER; TOKENS TO OTHER ELEMENTS. |
| NO MATCH | OUTPUT "NOMATCH" FOR RESPONSE; NO MATCH SO RESPOND TO USER. |
|  | JUMP TO COMPUTER O.S. |

The Type Identifier examines the word types and punctuation in sequences, also looking for keywords, in order to determine the type of operator sentence given (e.g., a questions, a command, a declarative, etc.). By narrowing the type of sentence down to only one through the use of its search-tree-like structure, the Type Identifier greatly reduces the work to be done by the Sentence Structure Analyzer.

The Type Identifier evaluates the word and punctuation types that each command word was tagged with by the parser. The sequence of generic word/punctuation types is compared with a lookup table and the entry in the table matching the sequence of generic word types contains the generic sentence type. This generic sentence type is outputted to the Sentence Structure Analyzer.

EXAMPLE B

|  |  |
|---|---|
| | IMPORT TYPE-TABLE; BASE ADDRESS OF WORD TYPE TABLE. |
| | IMPORT COMMAND-TOKEN; POINTER TO COMMAND TOKENS. |
| | IMPORT NUMBER-COMMAND-TOKENS; HOW MANY TOKENS TOTAL? |
| NEW TYPE | GETWORD (COMMAND-TOKEN+A); IMPUT A COMMAND TOKEN. |
| | INCREMENT A; NUMBER OF TOKENS PROCESSED POINTER. |
| | COMPARE (COMMAND-TOKEN) TO (TYPE-TABLE); SEARCH TABLE FOR TYPE MATCH. |
| | IF NO MATCH GO TO NO MATCH; IF NO MATCH SEND MESSAGE. |
| | PRESENT-TYPE = TYPE-TABLE; SAVE STATE IN INITIAL MATCH |
| | IF A < NUMBER-COMMAND-TOKENS GO TO NEWTYPE; END OF TOKENS? |
| | TYPE-TABLE = PRESENT-TYPE; RESTORE STATE |
| | GENERIC-TYPE = TYPE-TABLE; FROM GENERIC TYPE POINTER. |
| | OUTPUT GENERIC-TYPE; OUTPUT GENERIC TYPE POINTER. |
| | JUMP TO SENTENCE STRUCTURE ANALYZER; GO TO NEXT ELEMENT. |
| NO MATCH | OUTPUT "NO MATCH" FOR RESPONSE; SEND RESPONSE TO USER. |
| | JUMP TO COMPUTER O.S. |

The word table is used to convert a string of generic word types into a generic sentence type and is formatted as follows:

| | WORD TYPE TABLE | |
|---|---|---|
| ENTRY# | GENERIC WORD TYPE STRING | GENERIC TYPE |
| (GENERIC-TYPE) 1 | "VERB, ADVERB, NOUN!" 2, 3, 1, 12 | "COMMAND" 1 |
| 2 | "NOUN, ADJECTIVE, VERB?" 1, 4, 2, 13 | "QUESTION" 2 |
| " | " | " |
| " | " | " |

|  |  |
|---|---|
| RESET | IMPORT SENTENCE-TYPE-TABLE; BASE ADDRESS OF SENTENCE TYPE TABLE |
| | IMPORT SENTENCE-POSITION-TABLE; BASE OF SENTENCE WORD POSITION TABLE. |
| | IMPORT COMMAND-TOKEN; POINTER TO COMMAND TOKEN. |
| | IMPORT NUMBER-COMMAND-TOKENS; NUMBER OF TOKENS TO BE PROCESSED. |
| | GETWORD (COMMAND-TOKEN [WEIGHTING FACTOR]+A); INPUT WEIGHTING FACTOR OF EACH COMMAND TOKEN; |
| | INCREMENT A COUNT WORDS. |
| LOOP | COMPARE WEIGHTING-FACTOR TO (SENTENCE-POSITION-TABLE)+; SEARCH FOR A MATCH. |
| | IF MATCH OUTPUT "ACTIVATE" TO (SENTENCE-POSITION-TABLE +A) |
| | ; THIS WILL ACTIVATE A LOCATION IN |
| | IF A < NUMBER-COMMAND-TOKENS; THE DECISION ENGINE. |
| | GO TO RESET; NEXT COMMAND TOKEN. |
| | ELSE GO TO TYPE TOKEN; NO CHECK SENTENCE TYPE. |
| TYPETOKEN | GETWORD (GENERIC-TYPE) |
| LOOP | COMPARE (GENERIC-TYPE) TO (SENTENCE-TYPE-TABLE)+; SEARCH FOR SENTENCE TYPE. |
| | IF MATCH OUTPUT "ACTIVATE" TO (SENTENCE-TYPE-TABLE) |
| | GO TO EXIT |
| | ELSE LOOP |
| EXIT | JUMP TO DECISION ENGINE |

The Sentence Structure Analyzer uses its search-tree-like structure to evaluate the word sequence, and punctuation sequence, passed to it by the Parser. By comparing the sequences with table-stored generic sequences, the Sentence Structure Analyzer determines the attributes and contents of the sentences (such as the subject, predicate, any keywords, etc.).

The Sentence Structure Analyzer receives the command word sequence tagged with generic word type and vocabulary library number as well as the generic sentence type. The vocabulary library entry is evaluated for each word to determine if the word is a keyword and obtain a weighting factor. A table is used which correlates weighting factor versus word position and uses the weighting factor to determine the position within the Decision Engine that the command word belongs and that location is activated through the command token.

The command token takes the following form: Command word 1, type, weighting factor; Command word 2, type, weighting factor;

EXAMPLE C

The sentence position vs. weight factor and sentence typ weighting factor search table has the following format:

| | SENTENCE POSITION | | | | | |
|---|---|---|---|---|---|---|
| | 1 | 1 | 2 | 3 | 4 | ... |
| WEIGHTING | 2 | 5 | 6 | 9 | 15 | ... |
| FACTOR | 3 | 3 | | | | |
| | 4 | 2 | | | | |
| | SENTENCE TYPE | | | | | |
| | 1 | 2 | 3 | 4 | — | — |
| | 16 | 21 | 31 | 10 | — | — |
| DECISION ENGINE ACTIVATION LOCATION | | | | | | |

If the operator sentence is nonsensical, the Sentence Structure Analyzer will detect it since no match can be made, and a request for clarification will be generated.

Since the type of each word has been determined and labelled, comparison is done by word and punctuation types (noun, verb, etc.) in a generic manner without utilizing any particular words. This procedure greatly simplifies the structure analysis and allows a small library of tokens to contain a large amount of useful information, an important point when utilizing a personal computer with its limited resources, memory, speed, etc.

The Sentence Structure Analyzer, after determining the type of sentence and its contents, passes on this information in the form of command tokens to the software process. The command tokens (a sequence of tokens such as word type, punctuation type, sentence structure and content analysis) are evaluated in sequence by the decision engine task of the software process to determine the goal of the sentence. (Confirmation of the goal may be requested through response tokens.)

The natural language processor may then operate in reverse, a procedure in which the software process passes a decision, or goal evaluation, back to the natural language processor in the form of response tokens, for reconstruction by the Sentence Structure Analyzer into the operator's own language, thereby providing interactive communication with the operator and allowing even untrained operators to command the mobile robot effectively.

The response token produced by the software process, when used to interactively communicate to the operator the evaluation of a goal, (often done before work begins on the goal), may use the natural language processor to evaluate the quality of the response, as a means of feedback to reduce the chance of a nonsensical response. This is done by feeding the response, outputted by the Sentence Structure Analyzer, back into the Parser of the natural language processor in order to generate an analysis of the meaning of the response sentence. If the response sentence is "nonsense," then the output of the natural language processor would not compare well with the original response token generated by the Decision Engine task of the software process; therefore, a re-evaluation of the response would ensue as an iterative process until a grammatically correct response was generated.

Although natural language processors are well-known in the prior art, the specific design of this one is here given because the type of format of output, as well as the application of this natural language processor, is unique to the present invention.

Figure 4:
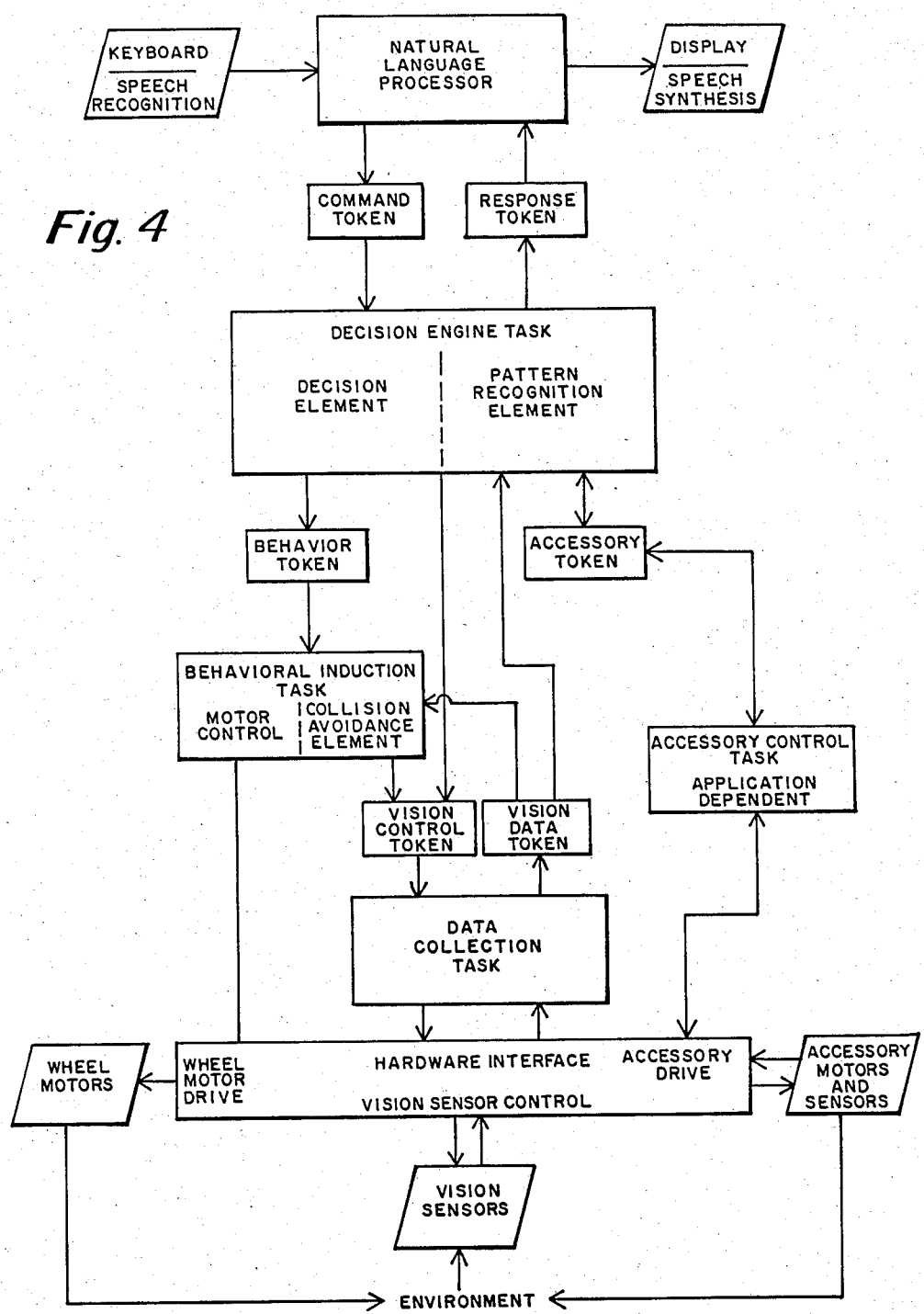
FIG. 4 is a flow chart of the software process employed in the invention.

Referring now to FIG. 4, a software process flow chart illustrating the data flow and hierarchical structure is shown. This flow chart illustrates the flow of data to and from the software process, and the hardware interface.

The software process is composed of four separate tasks.

The highest level task is the Decision Engine task. This task is an elementary artificial intelligence task designed to use simple tokens (words, numerical constants; chains of words, and labels, etc.) as data or rules to manipulate the vision system data tokens. These forms of data are utilized in conditional statements designed for manipulating tokens, and these conditional statements, although analogous to, are different from those used to manipulate numerical date in ordinary computer programming. Since, in artificial intelligence programming, tokens are the arguments, they may have virtually any meaning behind them—not just a number.

A token is any label specified as simple words, or numerical constants, which has a meaning attributed to it such as "DOOR" or "MOVE," as specified in the token data base. The token database is a library which contains a token and its meaning (as related to it) for the purpose of converting back and forth between the two. By using tokens as the objects to be processed by the rules, this task is free from the time-consuming need to directly manipulate machine-level instructions (or subroutines in their true form) and, therefore, the decision-making process is able to reach a complexity high enough to allow an autonomous mobile robot using presently available personal computers to be practical.

The Decision Engine task receives command tokens from the operator through the user interface. These command tokens may take the form of a direct command to perform an action in the manual mode, such as "move 10 feet forward," or, the form of a string of more general instructions such as "find the DOOR" and pass through into the "HALLWAY"; or, they may even specify a question requiring a response through a response token. All of these command tokens are in the form of simple words, each having a specific meaning to the Decision Engine task: basically, this task evaluates the tokens to determine the objective or goal of the operator command. The data collected from the vision system also takes the form of a token (vision data tokens) which can be manipulated by rules within this same Decision Engine task.

The meaning of value of a vision data token, as known to the mobile robot, is held within the comprehensive library; it usually takes the form of patterns of data representing "seen" objects in the work space; these patterns are used for pattern-matching and object recognition.

This task is composed of two parallel elements: the Decision element which carries out the decision-making within this task, and the Pattern-Matching element which manipulates and relates the vision system data patterns in order to find matches with known, or previously taught, library stored patterns. Each pattern is then related, in the library, to a token of an object or scene, such as the pattern seen when facing a doorway which is related to the token for "DOOR."

The Decision element receives the command tokens from the operator. These tokens are interpreted by rules, either basic—generic—or rules specific to an application, to determine the meaning and goal of the command. With the goal and meaning of the command determined, the specific and appropriate course of action to be taken to reach the goal is decided upon.

This goal could be either a specific action such as "MOVE FORWARD 10 FEET" requiring no decision-making except to determine the goal—a position 10 feet forward from the present position, or the goal could be a more abstract and complex objective such as "FIND THE DOOR" which requires many decisions (what's a door?) and a response using response tokens fed back to the user interface requesting operator confirmation, if necessary.

The Decision Engine is activated by command tokens from the Natural Language Processor. The command token sequence has the effect of activating individual locations in the goal determination area. The Decision element scans the goal determination area for activated locations. Each activated location holds an element of the overall goal and these individual elements are strung together to form an overall goal.

Each element in the goal string corresponds to a behaviour type and the string of behaviour types form a behavior token. This behavior token may be comprised of vision patterns, subroutine calls, etc. and this behavior token is outputted to the Behavioral induction task. The same output is sent to the response element of the Natural language processor which generates a response to the user.

cessing the command "FIND THE DOOR" where the rule would be used after the door was located in the workspace and also this rule may be used to derive simpler rules such as one used to evaluate "MOVE FORWARD X FEET" where X is the distance to be moved.

Once a path to the "DOOR" is defined, the Decision element outputs an assembled behavior token (a token describing the path and the goal in simple terms) to the Behavioral Induction task for conversion of the token into actual movement.

This task, using vision data tokens, "sees" the work-

EXAMPLE D

```
                IMPORT PATTERN-MATCH-REQUEST; PATTERN MATCH NEEDED?
                IMPORT LANDMARK-REQUIRED; LANDMARK SEARCH NEEDED?
                IMPORT VISION-DISPLACEMENT; DISPLACEMENT TO NEEDE VISION DATA?
                IMPORT LANDMARK-DISTANCE; SPEED RELATED FACTOR.
                IMPORT SCAN-BLOCK-SIZE; HOW BIG ARE BLOCKS IN SCAN AREA
                IMPORT GOAL-SCAN-AREA; BASE OF SCAN AREA.
                IMPORT GOAL-SCAN-AREA-SIZE; HOW BIG IS SCAN AREA.
                GETWORD (GOAL-SCAN-AREA); INPUT A SCAN WORD.
                SCAN-BLOCK-LOCATION = GOAL-SCAN-AREA; SAVE POINTER TO THE SCAN WORD.
SCAN            COMPARE (SCAN-BLOCK-LOCATION)+ TO "ACTIVATED"; IS THIS LOCATION
                ACTIVATED
                IF MATCH SAVE SCAN-BLOCK-LOCATION AT BEHAVIOR TOKEN; PASS ON GOAL
                AND AT RESPONSE-TOKEN; INFORMATION.
                IF SCAN-BLOCK-LOCATION = GOAL-SCAN-AREA GO TO PATTERN-CHECK
                GO TO SCAN
END             OUTPUT BEHAVIOR-TOKEN TO BEHAVIORAL INDUCTION TASK; SEND TOKEN
                POINTER TO BEHAVIOR TASK.
                JUMP TO BEHAVIORAL INDUCTION TASK; GO TO NEXT TASK.
                THE DECISION ENGINE SCAN BLOCK FORMAT IS AS FOLLOWS:
                START OF BLOCK ... "ACTIVATED" LOCATION, BEHAVIOR TYPES
                (LANDMARK-DISTANCE), VISION DATA PATTERNS ...
                END OF BLOCK
PATTERN-CHECK   GET WORD (PATTERN-MATCH-REQUEST)
                GET WORD (LANDMARK-REQUIRED)
                PATTERN A = SCAN-BLOCK-LOCATION + VISION-DISPLACEMENT
                PATTERN B = SCAN-BLOCK-LOCATION + 2 *VISION-DISPLACEMENT
                GET WORD (PATTERN A, PATTERN B); PATTERN B IS ACTIVE SENSORS.
                JUMP TO PATTERN MATCHING ELEMENT: GO GET PATTERNS MATCHED.
```

The rules, as used by this element, are conditional statements, or groups of conditional statements, where the arguments and results are in the form of tokens representing and relating any piece of information used by the mobile robot (such as vision data tokens, object labels, etc.), or even other rules.

In this way, a command such as "MOVE TO THE DOOR" is evaluated by a rule which is analogous to "3+4=7" where "MOVE" is the "3", an operand, and "TO THE" is the operator "+", which may be a subroutine which defines the meaning of "DOOR" and defines the direction and distance to the "DOOR", once found by the pattern recognition elements, which is the "4" other operand, and the output is "7" the path, or course, decided upon to reach the "DOOR". The token containing the meaning of this rule to evaluate "MOVE TO THE DOOR" is composed of tokens for the evaluation of the tokens of the individual components of the command; they are chained together, but stored in the library of tokens in individual form. This rule to evaluate "MOVE TO THE DOOR" might be used in prospace and relies on the pattern-matching element for analysis of the workspace and objects in the workspace. The pattern-matching element provides the conversion of a "seen" environment into meaningful terms as tokens, and this group of tokens, which describe the environment at any given time, is the key to providing an autonomous and practical mobile robot.

The pattern matching element is used to match a stored vision string to the present environment to locate an object. It also provides the output pattern of landmarks in the environment. Landmark appraisal is performed by matching the robot's particular location with the landmark pattern to determine what objects should be around the robot and this pattern is compared with the live vision pattern. A correlation value is generated for the match and this number is reported back to the decision engine task for decision making or to the Behavioral Induction task for collision avoidance and/or course correction.

EXAMPLE E

```
                IMPORT LANDMARK-DISTANCE; DISTANCE FACTOR IN BEHAVIOR TYPE.
                IMPORT ACTIVE-SENSORS; WHAT SENSORS ARE ACTIVE.
                IMPORT DATA-PATTERN; LOCATION OF REALTIME VISION DATA.
                IF PATTERN-MATCH = TRUE GO TO PATTERN MATCH; IF FLAG IS TRUE BRANCH.
                GETWORD (ACTIVE-SENSORS); INPUT WHICH SENSORS ARE ACTIVE.
                GETWORD (LANDMARK-REQUIRED); INPUT LANDMARK FLAG.
NEW PATTERN     GETWORD (DATA-PATTERN) + ; INPUT VISION DATA.
                INCREMENT A; INCREMENT DATA POINTER.
                IF (DATA-PATTERN) > LANDMARK-DISTANCE; CHECK DATA AGAINST FACTOR.
                SAVE "0" AT (LANDMARK-PATTERN) + ; SAVE LANDMARK PATTERN
```

| | -continued |
|---|---|
| | ELSE SAVE "1" AT (LANDMARK-PATTERN) + ; DITTO. |
| | IF A = ACTIVE-SENSORS; IS THIS A VALID SENSOR. |
| | GO TO END; END OF COMPLETE POLL OF SENSORS. |
| | ELSE GO TO NEW PATTERN; SEARCH FOR MORE LANDMARKS. |
| END | OUTPUT LANDMARK-PATTERN TO DECISION ENGINE; SEND LANDMARK POINTER TO REQUESTING TASK. |
| PATTERN MATCH | IF LANDMARK-APPRAISAL = TRUE; CHECK LANDMARK FLAG. |
| | INPUT LANDMARK-PATTERN FROM BEHAVIORAL INDUCTION |
| NEW DATA | GETWORD (LANDMARK-PATTERN) + ; CHECK FOR PATTERN MATCH |
| | GETWORD (DATA-PATTERN) + ; INPUT REALTIME DATA. |
| | INCREMENT A.; HOW MANY MATCHES. |
| | SUBTRACT (LANDMARK-PATTERN) FROM (DATA-PATTERN) = RESULT |
| | IF MIN < RESULT < MAX.; CHECK FOR MATCH. |
| | ADD 0 TO CORRELATION VALUE; GOOD MATCH! |
| | ELSE ADD 1 TO CORRELATION-VALUE; BAD MATCH! |
| | IF CORRELATION-VALUE ≦ CORRELATION-LEVEL; THRESHOLD CHECK. |
| | OUTPUT "ON COURSE" TO CALLING TASK |
| | ELSE OUTPUT "OFF COURSE" TO CALLING TASK |
| | RETURN TO CALLING TASK |

Simple, direct command tokens requiring no decision-making beyond interpretation (such as "MOVE FORWARD 10 FEET") are simply converted to behavioral tokens defining the goal—to "MOVE" within the workspace to a predetermined position; the adjective "FORWARD"—the direction of the path at that instant; and the scalar "10 FEET"—the magnitude of the action.

The comprehensive token library, therefore, may contain tokens whose meanings range from other tokens (or chains of tokens) as rules, to vision data tokens and patterns of vision data tokens, all in a form related to a label in plain words which are known to the mobile robot.

The artificial intelligence principles and algorithms used for decision-making and rule interpretation which compose the Decision Engine task are taught in a general form by "Principles of Artificial Intelligence", Vols. 1, 2, 3 by P. Cohen and E. Feigenbaum, published by the William Kaufman Publ. Co.

The pattern matching element is the key to utilization of the vision system. The Decision element request pattern matching, and object recognition searches, and passes on a pattern to be matched. The vision system data is a string of numbers of a value from 0 to 65,535, produced by each vision sensor denoting the distance(s) between each sensor and the "seen" objects and attributes within the workspace. The pattern matching element may pass commands to the Data Collection task to direct the vision system configuration, thereby allowing control over what vision data is to be collected and limiting this data to only that data needed to fulfill the needs of the present goal.

FIG. 6 is a diagram illustrating the portion of the workspace, in the horizontal plane, that each vision sensor "sees". Each sensor, for example, may cover one tenth of the total workspace in the horizontal plane, which in angular terms is $2\pi$ radians divided by ten sensors. (This relationship between the sensor array and the workspace is symmetrical by design.) The geometrical symmetry of the sensor array allows the pattern-matching element to rotate and manipulate the vision system data, simulating the rotation of the mobile robot, in multiples of $\pi/5$ intervals, whereby the pattern-matching element is aided in comparing the data against library stored patterns or previously taught patterns in seach of a match for the objective, such as "DOOR". This is the crucial capability needed to make artifical vision work in a practical manner in realtime. The pattern match need not be exact, which frees the mobile robot from maintaining an exact path. The requisite searching and matching algorithms are taught by the previously cited "Principles of Artificial Intelligence" publication and are used to find as close a match as possible. Once a match is found, the distance and direction of the objective, as well as the pattern of the obstacles in the workspace, is passed back to the Decision element—which then plans out a path to the objective, bypassing and circumventing obstacles, and passes behavior tokens describing the goal at the present moment to the Behavioral Induction task.

FIG. 7 shows the angular extent that the vision sensors 1, 2, 3a, 3b, 3c, cover in the vertical plane and illustrates how the secondary vision sensors 2 are used to provide detection of objects in the near range. The resulting data is especially useful in collision avoidance detection and avoidance of stairways and other subsurface obstacles in the workspace. Vision sensor 3c is mounted close to the work surface, at a downward angle to obtain data about floor coverings, and vision sensor 3a is mounted at the top of the mobile robot body preferably facing straight upward to obtain data on ceiling height, or at an upward angle 3b to obtain data on the ceiling to wall junction.

The Decision Engine element, after formulating a decision and course of action, informs the operator through the user interface (through response tokens) utilizing speech synthesis/recognition or other means, what decision has been reached in an interactive manner as a method of feedback to assure correct operation.

In the even the Decision Engine task cannot reach a decision, or an interpretation of an operator command token, the Decision Engine task informs the operator that the command was not sufficient, or clear, or was invalid—and then asks for clarification from the operator through the user interface.

The Decision Engine element also determines the mode of operation of the mobile robot. The operator may request that this element change to manual/teaching mode, where no decision making is undertaken. This mode is used for either teaching the mobile robot to perform a new task or recognize a new object, using declarative command sentences and a joystick as inputs to the user interface; or, this mode may be used for exact control of the mobile robot in order to perform intricate operations, such as controlling the actions of an accessory attachment.

The Decision Engine element, in its role as the guidance control of the mobile robot, determines when the mobile robot is disoriented or lost (using vision system data), and implements rule based procedures to re-orient the mobile robot; it can even request assistance from the operator (or other person) in the workspace. Disorientation might occur if, for example, the furniture of an office were re-arranged, thereby rendering useless some of the formerly-stored vision data patterns (old patterns obsolete—new patterns apply).

The output of the Decision Engine task, (for example, decisions concerning what path to follow to achieve a goal) is passed on to the Behavioral Induction task in the form of behavioral tokens. These are high-level behavior tokens in that the Decision Engine task does not specify the exact chain of actions and distances to be traversed in a movement but rather passes on information about the layout of the workspace and the position of the objective, or goal, in that frame of reference, as well as the general path to be taken and the type of behavior to be followed by the mobile robot to attain that goal.

The Behavioral Induction task parses the Decision Engine task output and decodes the result into behavior types. Behavior types are conventional subroutines each of which carries out some basic action of the robot. The decoded sequence of behavior types are then carried out, resulting in the robot performing the actions decided upon to reach the goal.

The parsing of behavior tokens is done through table comparison for speed and simplicity. New behavior types are added by adding them to the table.

The output of the behavioral induction task is in the form of commands to the wheel motor drive and data collection tasks.

In this way, the Decision Engine task does not deal with specific machine-level instructions; it simply deals with high-level behavioral tokens only.

In the manual mode, the Decision Engine task stores the rules and object definitions (taught by the operator) within the vocabulary library; it also passes its "interpretation" of the operator command tokens to the Behavioral Induction task for direct action.

The Behavioral Induction task receives from the Decision Engine task the behavior tokens describing the workspace, the position within the workspace of the goal(s) of the action to be performed, and the general path to be taken. This task uses conditional statements to analyze the received information to determine the direction of the objective relative to the mobile robot, the direction the mobile robot is facing within the workspace, the distance to the objective (following the path specified by the Decision Engine task), the speed to be reached during movement, and the position of any obstacles (or landmarks) along the defined path which may be used during movement as guide points for maintaining orientation and insuring successful completion of the action, with full collision avoidance protection.

The behavioral induction task periodically requests a vision pattern from the data collection task during movement. The values in this pattern are scanned and compared to a factor, related to robot velocity, to determine if collision is likely and take evasive action.

EXAMPLE G

EXAMPLE F

```
              IMPORT NEW-TOKEN.; FLAG SET BY DECISION ENGINE WHEN NEW
              DECISION IS PASSED DOWN
              IMPORT TYPE-DISPLACEMENT; DISP. FROM SCAN-BLOCK LOCATION TO BEHAVIOR
              TYPES
              IMPORT BEHAVIOR-TOKEN; BASE OF SCAN-BLOCK LOCATION LIST
              IF NEW-TOKEN = FALSE GOTO COLLISION;
              BEHAVIOR-TYPE = BEHAVIOR-TOKEN + TYPE DISP.; GET POINTER TO BEHAVIOR
              TYPE
              CLEAR NEWTOKEN
NEW TYPE      GETCHAR (BEHAVIOR-TOKEN); INPUT BASE POINTER
              GETCHAR (BEHAVIOR-TYPE); INPUT BEHAVIOR TYPE
              IF BEHAVIOR-TYPE = "NONE" GOTO END; END OF TYPES IN THIS TOKEN!
              ELSE BEHAVIOR SUB-ROUTINE = BEHAVIOR-TYPE + 100; CONVERT TO LOCATION OF
              BEHAVIOR TYPE
              JUMP TO BEHAVIOR-SUB-ROUTINE; EXECUTE SUBROUTINE
              RETURN FROM BEHAVIOR-SUB-ROUTINE; RETURN AND GO ON TO NEXT BEHAVIOR
              TYPE
              INC-BEHAVIOR-TOKEN.; INCREMENT TOKEN POINTER
              GOTO NEWTYPE; CONTINUE SEARCH.
END           COLLISION = TRUE; ENTER COLLISION MODE
COLLISION     SEE EXAMPLE H;
                 ′
                 ′
END
NEWTOKEN      JUMP TO DECISION ENGINE ; ROUND ROBIN FLAG SYSTEM
CHECK            ′ Y: COLLISION = FALSE; USED TO CHECK
                      NEW TOKEN = TRUE
                 ′
                 ′ N: COLLISION = TRUE; DECISION STATUS.
                      NEW TOKEN = FALSE
                      LANDMARK REQUIRED = NOT LANDMARK REQUIRED
              RETURN TO BEHAVIORAL INDUCTION
```

```
              IMPORT ROBOT-DIRECTION; ROBOT DIRECTION
              IMPORT DATA-PATTERN; REALTIME DATA PATTERN
              IMPORT VELOCITY-FACTOR; VELOCITY FLAG.
              IMPORT NEWTOKEN; DECISION ROUND ROBIN FLAG
              IMPORT COLLISION; COLLISION AVOIDANCE ROUND ROBIN FLAG.
```

-continued

| | |
|---|---|
| COLLISION | IF COLLISION = FALSE GO TO NEW TOKEN CHECK; ONLY PERIODIC COLLISION CHECK |
| NEWDATA | GETWORD (DATA-PATTERN) +; INPUT REALTIME VISION DATA. INC-A; ONLY HORIZONTAL FACING SENSORS GETWORD (ROBOT-DIRECTION) +; ACTIVE, WHAT DIRECTION ARE WE GOING IF DATA-PATTERN < VELOCITY-FACTOR; CHECK FOR COLLISION AND AND ROBOT-DIRECTION = A; IF OBJECT IS IN ROBOT PATH. GOTO MANOUVER; IF SO, TAKE ACTION ELSE IF A > ACTIVE-SENSORS; GET NEW DATA OR END CHECK GOTO NEWDATA; CONTINUE SEARCH. |
| MANOUVER | OUTPUT "PATH-BLOCKED" TO DECISION ENGINE TASK JUMP TO DECISION ENGINE TASK. |

This Behavioral Induction task uses basic inductive methods to evaluate the high-level behavior tokens, to assess their meaning, and to convert their meanings by the selection of the appropriate data patterns which can then be utilized to perform the actions needed to reach the present goal.

This Behavioral Induction task contains a library which relates each of the behavior tokens (delivered by the Decision Engine task) to low-level machine instructions. These low-level instructions take the form of subroutines, each of which results in the taking of one specific mobile robot action (e.g., turn right, move forward, or act in this way for this long). As an example, the subroutine to move forward outputs (through the hardware interface) a digital-value signal causing both motors of the two-motor drive system to run in parallel at some comparable speed, and either sets a software timer to time out (stop) when the specified distance has been traversed (since the speed of motion is known, the time needed to move a specified distance is also known; the time factor is loaded into the timer) or the signal simply allows the mobile robot to continue movement until a new decision has been reached and passed down from the Decision Engine task. Movement, however, is stopped (or reassessed) by the Behavioral Induction task if an unexpected obstacle should appear in the mobile robot's path.

In this preferred embodiment, both the Decision Engine task and the Behavioral Induction task continually monitor the environment (which is dynamically changing during movement), and continually evaluate the present goal for correctness since these tasks are not burdened with the responsibility for continually supervising the wheel motors. As a result, the Behavioral Induction task converts high-level decisions passed to it as behavior tokens into physical mobile robot motion, greatly reducing computer resource requirements.

During Individual movements, the Behavioral Induction task is in complete control of the mobile robot. The Decision Engine task is inactive and becomes active only periodically to evaluate progress in case in-course correction is needed, or when the goal is reached. While the mobile robot is moving, the Behavioral Induction continually monitors the environment for hazards and landmarks. This task uses behavioral tokens which define obstacles or objects in the workspace and it employs subroutines, at the proper time and position within the workspace, to check for proper relationship between the mobile robot and these landmarks at key positions along the path of movement as a means of real time course correction. If a mismatch occurs, control is returned to the Decision Engine task. Thus, as objects come into the near-range, the Behavioral Induction task can assess whether or not the object is expected (seen by the Decision Engine in the far range previously, as a known landmark would be), or unexpected—which would require reassessing the decision and path against which that the mobile robot is operating. This is an important point: since the mobile robot can determine objects, workspace layouts, and the goal therein specified in a generic manner, the mobile robot does not need to be programmed with some specified workspace layout before operation and, therefore, is not application dependent.

The mobile robot needs only to be taught in generic terms what an object is, such as a "DOOR". The vision data pattern represents this object in a general way, but is not tied to any particular door or doorway. This allows the mobile robot to efficiently traverse the workspace in a practical manner using a minimum of computer resources.

During movement of the robot, the Behavioral Induction task is responsible for collision avoidance. To this end, the Behavioral Induction task monitors vision-system data on a constant basis, watching for any unexpected obstacles directly in the mobile robot's path and responds immediately by either stopping, or maneuvering around an obstacle. Whether the mobile robot stops or maneuvers depends on the obstacle and its relationship with the workspace and the path to the goal (such as a desk or a wall which can, and cannot, be maneuvered around, respectively).

The ability to maneuver around an obstacle on an instantaneous basis is provided through the use of preprogrammed methods, in the form of data, which appraise the workspace adjacent to the obstacle to determine if a clearing is available to pass through. This ability relieves the vision system and Decision Engine task from the need to perceive the workspace in a high resolution manner in which all obstacles can be seen. (Using ultrasonic transducers, such high resolution is not feasible.) In addition, this preferred embodiment precludes the need for the mobile robot to contact obstacles to determine their location.

An "obstacle", for collision avoidance purposes, is any physical object or stairway in the path of the mobile robot, from a desk to an electric wire, which would impede the mobile robot from reaching an objective and for which a path around has not been previously plotted.

To assist the Behavioral Induction task in gathering the maximum needed vision system data for collision avoidance and to maximize the data rate, this task commands the Data Collection task, using the direction of the movement, to poll only the vision sensors facing in that direction. The Behavioral Induction task also commands the Data Collection task to limit the vision system to monitor only the near range (on the order of 3 to 4 feet). This limits both the data to be correlated and the time between cycles, giving the effect of an increased data rate for collision avoidance.

This higher effective data rate allows faster decision-making during collision avoidance—where fast decisions are needed so that an obstacle can be detected and reacted to before contact is made. This process also allows the mobile robot to reach higher speeds during movement to enable the robot to perform its task more efficiently.

The most basic task in the software process is the Data Collection task. This task controls the polling of vision system sensors and the collection of data from each sensor. This task also controls the storage of vision system data in the computer memory.

The Data Collection task, as indicated in FIG. 4, receives control instructions from the Decision Engine task and Behavioral Induction task in the form of vision control tokens. These control tokens can command changes in the number of sensors to be scanned, and the time domain of each sensor. Consequently, the number of sensors to be scanned can be rapidly changed to limit the data gathered to only the minimal amount absolutely necessary for the operation being performed at any instant in time.

By limiting the total number of sensors to be polled in a cycle, the time required for one complete cycle is reduced, thereby effectively increasing the data rate.

Software shifting of each sensor time domain constrains the polling time in a given cycle allotted to each active sensor to that best suited to the particular objective at that moment in time. For example, when the Decision Engine task needs to appraise the entire workspace, the time domain must be long enough to allow reception of echoes from the most distant points in the workspace (a maximum of 35 feet with some of the now available ultrasonic transducers). Since this condition of echo reception entails a long time domain, the Decision Engine task will command it. However, when the mobile robot is moving, only obstacles in the near range are of concern; therefore, the Behavioral Induction task will command a short time domain for each active sensor. Consequently, the time used in polling each active sensor is reduced, polling system time is reduced, and the vision system data rate is increased to the highest rate possible, enabling the Behavioral Induction task to accomplish obstacle appraisal and collision avoidance action as quickly as possible. Because the vision-system software controls enable the actual configuration of the vision system to be modified dynamically to best suit the needs of the robot, the result is an efficient, flexible, and inexpensive vision system for the mobile robot.

It is important to note that the drawings are not drawn to scale and are normative only and that dimensions and distances in the figures are not to be considered significant. It is to be understood that while the drawings and the foregoing specification describe a preferred embodiment of the invention, they are for purposes of illustrating the principles of the present invention and that the invention can be embodied in other ways. For example, although the invention has been described as using ultrasonic sensors it is obvious that optical ranging devices can be used in conjunction with or as replacements for the sonic sensors. Inasmuch as light travels much faster than sound, optical ranging devices can provide a much faster vision system. As another example, while the computer is described as disposed on the robot to make the robot autonomous, it is evident that the computer need not be so carried where a two way communication link is provided between the computer and the robot. As another example, the number and location of the transducers can be altered, depending upon the resolution and sensitivity required of the vision system. Other obvious changes and substitutions can be made without departing from the essentials of the invention. Accordingly, it is intended that the invention not be limited to the precise embodiment disclosed herein but rather that the scope of the invention be construed in accordance with the appended claims.

What is claimed is:

1. In a mobile robot of the type having
   (a) a vision system,
   (b) memory means for storing data derived from the robot vision system, and
   (c) a computer for processing data derived from the robot's vision system,
the improvement wherein the robot's vision system comprises
   (i) a first array of ranging transducers for obtaining data on the position and distance of far objects in a volume of space, the transducers of the first array being symmetrically disposed on the mobile robot with respect to an axis of symmetry within the mobile robot, each transducer of the first array being fixed in position with respect to that axis of symmetry and seeing a portion of the volume of space seen by its entire array;
   (ii) a second array of ranging transducers for obtaining data of the position and distance of near objects in the same or an overlapping volume of space, the transducers of the second array being symmetrically disposed on the mobile robot with respect to said axis of symmetry, each transducer of the second array being fixed in position with respect to said axis of symmetry and seeing a portion of the volume of space seen by its entire array, the angle of view of the transducers of the second array being different from the angle of view of the transducers of the first array with respect to the same object in space; and
   (iii) means for polling said ranging transducers in sequences determined by the computer.

2. The improvement according to claim 1, further comprising
   (iv) at least one additional ranging transducer on the mobile robot for obtaining data relative to said axis of symmetry on the position and distance of objects outside the field of view of the first and second transducer arrays.

3. The improvement according to claim 1, wherein
   (v) said axis of symmetry is fixed with respect to the body of the mobile robot and extends centrally through that body.

4. In a mobile robot of the kind carrying at least one array of vision sensors that provide data by which the position and range of objects relative to the robot can be ascertained, the improvement of an architecture for controlling the mobile robot comprising
   (a) vision data collection means responsive to input data from the vision sensors for outputting vision data tokens,
   (b) natural language processor means for accepting information in natural language and outputting command tokens,
   (c) decision engine means responsive to command tokens from the natural language processor means and vision data tokens from the vision data collection means for outputting behavior tokens, (d) behavior induction means responsive to behavior tokens from the decision engine means for controlling movement of the mobile robot.

5. The improvement according to claim 4, further including means in the behavior induction means for outputting vision control tokens which control the sequence of activation of the robot's vision sensors.

6. The improvement according to claim 4, wherein the behavior induction means includes motor control means and the improvement further comprises (e) wheel motor drive means controlled by said motor control means, the mobile robot being mounted on wheels driven by said wheel motor drive means.

* * * * *